(12) United States Patent
Lapwood et al.

(10) Patent No.: US 12,299,062 B2
(45) Date of Patent: May 13, 2025

(54) METHODS AND SYSTEMS FOR WEB-BASED DATA PRESENTATION

(71) Applicant: Xero Limited, Wellington (NZ)

(72) Inventors: Alex Lapwood, Wellington (NZ); Alexander Lee, Wellington (NZ); Elise Wei, Wellington (NZ); Finn Clark, Wellington (NZ); Grzegorz Chudziński-Pawlowski, Wellington (NZ)

(73) Assignee: XERO Limited (NZ)

( * ) Notice: Subject to any disclaimer, the term of this patent is extended or adjusted under 35 U.S.C. 154(b) by 0 days.

(21) Appl. No.: 17/763,577

(22) PCT Filed: Aug. 25, 2021

(86) PCT No.: PCT/NZ2021/050154
§ 371 (c)(1),
(2) Date: Mar. 24, 2022

(87) PCT Pub. No.: WO2022/250547
PCT Pub. Date: Dec. 1, 2022

(65) Prior Publication Data
US 2024/0054170 A1    Feb. 15, 2024

(30) Foreign Application Priority Data
May 28, 2021  (AU) .............................. 2021901611

(51) Int. Cl.
*G06F 16/957*   (2019.01)
*G06F 16/958*   (2019.01)

(52) U.S. Cl.
CPC ........ *G06F 16/9577* (2019.01); *G06F 16/986* (2019.01)

(58) Field of Classification Search
CPC .......................... G06F 16/9577; G06F 16/986
See application file for complete search history.

(56) References Cited

U.S. PATENT DOCUMENTS 9,400,776 B1 *  7/2016  Kennedy, Jr. ......... G06F 40/106
2006/0031187 A1  2/2006  Pryce et al.
(Continued)

OTHER PUBLICATIONS

Andre et al., "Presentation layer of CMS Online Monitoring System", EPJ Web of Conferences, 2019, retrieved on Nov. 30, 2021. retrieved from https://www.epj-conferences.org/articles/epjconf/pdf/2019/19/epjconf_chep2018_01044.pdf.
(Continued)

*Primary Examiner* — Asher D Kells

(57) ABSTRACT

Described embodiments relate to a method comprising determining a dataset container for controlling rendering of at least part of a dataset on a display of a computing device. The dataset comprises tabular data including a plurality of columns and a plurality of rows. Determining the dataset container comprises: determining a data structure comprising a plurality of data column objects, each data column object of the plurality of data column objects configured to represent a respective column of the plurality of columns of the tabular data; setting a display status value associated with each data column object; and determining a dataset presentation structure encapsulating at least a part of the dataset in accordance with the data structure and the display status values. The method further comprises rendering the dataset presentation structure for display on the computing device, wherein the dataset container is configured to selectively exclude from the dataset presentation structure a set of data columns objects from among the plurality of data columns objects, the set of data columns objects being determined by the display status values of the respective data columns object.

20 Claims, 8 Drawing Sheets

(56) References Cited

U.S. PATENT DOCUMENTS

| | | |
|---|---|---|
| 2015/0032429 A1 | 1/2015 | Beers et al. |
| 2017/0206256 A1 | 7/2017 | Tsirogiannis et al. |
| 2018/0075051 A1 | 3/2018 | Bowman et al. |
| 2019/0266170 A1 | 8/2019 | Hazel et al. |

OTHER PUBLICATIONS

International Search Report and Written Opinion as issued in connection with International Patent Application No. PCT/NZ21/050154, mailed Dec. 23, 2021, 26 pages.

* cited by examiner

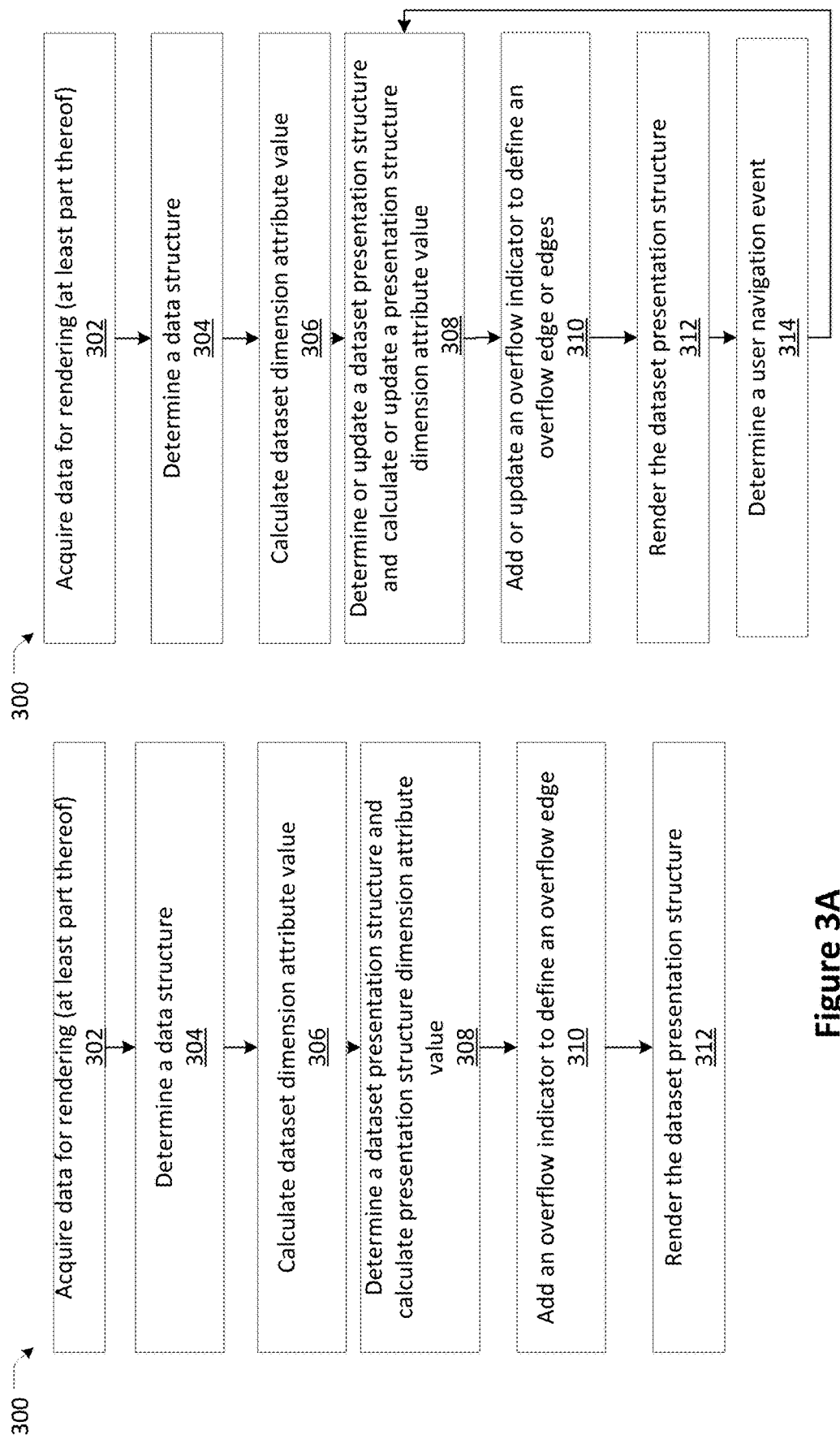

| Name | Bun | Main filling | Salad filling(s) | Sauce | Order note |
|---|---|---|---|---|---|
| Finn | Brioche | Beef patty | Onion, Lettuce, Pickles, Mushroom | Thousand Island | Please add cheese |
| Zac | Brioche | Beef patty | Onion, Lettuce, Pickles | Mayonnaise | Can you please add extra sauce? Cheers |
| Elise | Gluten free | Chicken | Lettuce, Pickles, Mushroom | Aioli | |
| Sam | Regular | Vege patty | | Tomato | |
| Taylor | No bun | Vege patty | | Mayonnaise | Peanut allergy |
| Add row | | | | | |

Figure 8

METHODS AND SYSTEMS FOR WEB-BASED DATA PRESENTATION

TECHNICAL FIELD

Embodiments generally relate to methods, systems, and computer-readable media for web-based data presentation. In some embodiments, the data include relational data or data in a table format.

BACKGROUND

Data relating to complex domains, including scientific, business, accounting, and/or financial domains, may comprise a large number of records and/or a large number of columns. Conventional computing devices may have limited display areas, limited memory and/or limited processing power making presentation and editing of data via the user interface cumbersome and unintuitive.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to determining a dataset container for controlling rendering of at least part of a dataset on a display of a computing device, the dataset comprising tabular data including a plurality of columns and a plurality of rows, determining the dataset container comprising: determining a data structure comprising a plurality of data column objects, each data column object of the plurality of data column objects configured to represent a respective column of the plurality of columns of the tabular data; setting a display status value associated with each data column object; and determining a dataset presentation structure encapsulating at least a part of the dataset in accordance with the data structure and the display status values; the method further comprising rendering the dataset presentation structure for display on the computing device; wherein the dataset container is configured to selectively exclude from the dataset presentation structure a set of data columns objects from among the plurality of data columns objects, the set of data columns objects being determined by the display status values of the respective data columns object.

In some embodiments, the dataset container is configured to selectively exclude the set of columns from the dataset presentation structure by setting a cascading style sheet (CSS) property value of each cell object of the set of columns to a value indicating not to render the respective cell object.

In some embodiments, the setting of the cascading style sheet (CSS) property value is performed by execution of a program code of the dataset container. In some embodiments, the program code is implemented using JavaScript. In some embodiments, the method may further comprise displaying the rendered dataset presentation structure in a user interface window on the display of the computing device; receiving an input indicating one or more of the plurality of columns from the user interface window, the input assigning a display status value to each cell of the indicated one or more columns; in response to receiving the input, updating the dataset presentation structure in accordance with the assigned display status values, and re-rendering the dataset presentation structure for display in the user interface window.

In some embodiments, the dataset presentation structure comprises a column selection structure to receive the input indicating the one or more of the plurality of columns. In some embodiments, the column selection structure comprises a user selectable and deselectable element corresponding to each of the plurality of columns included in the dataset presentation structure; and optionally wherein the user selectable and deselectable element comprises a checkbox or a radio button to receive the column selection input.

In some embodiments, the acquiring the dataset is downloading the dataset from a remote server such as a web server, and the rendering the dataset presentation structure is for display within a user interface window of a web browser application, and optionally wherein the display status values for the plurality of columns are configurable and/or reconfigurable via the user interface window of the web browser application. In some embodiments, the dataset presentation structure is configured to receive user input for editing the at least part of the dataset.

In some embodiments, each data column object comprises a plurality of cell objects, each cell object of the plurality of cell objects being configured to represent a respective row data of the plurality of rows of the tabular data of the respective column; and wherein the display status value is associated with cell object of each respective data column object; and wherein the dataset container is configured to selectively exclude from the dataset presentation structure a set of cells from among the plurality of cell objects, the set of cells being determined by the display status values of the respective data cell objects. In some embodiments, the plurality of cell objects are configured to receive user input for editing data in the plurality of cell objects.

Some embodiments relate to a dataset container comprising: a data structure comprising a plurality of data column objects, each data column object of the plurality of data column objects configured to represent a respective column of the plurality of columns of tabular data; and a display status value associated with each data column object; wherein the dataset container is configured to: determine a dataset presentation structure encapsulating at least a part of the tabular data in accordance with the data structure and the display status values; and render the dataset presentation structure for display on a computing device; wherein the dataset container is configured to selectively exclude from the dataset presentation structure a set of columns from among the plurality of columns, the set of columns being determined by the display status values of the column objects.

Some embodiments relate to a method comprising: determining a dataset container for controlling rendering on a display of a computing device of at least part of a dataset comprising tabular data including a plurality of columns, determining the dataset container comprising: determining a data structure, the data structure comprising a plurality of data column objects, each data column object of the plurality of data column objects configured to represent a respective column of the plurality of columns of the tabular data; calculating at least one dataset dimension attribute value relating to the entire dataset and representing a size of a rendering of the dataset in a first dimension; determining a dataset presentation structure encapsulating a part of the dataset in cells in accordance with the data structure, and calculating at least one dataset presentation structure dimension attribute value relating to the part of the dataset and representing a size of a rendering of the dataset presentation structure in the first dimension; wherein the dataset presentation structure includes adding an overflow indicator to a subset of the cells to define an overflow edge within the part of the dataset based on: the at least one dataset dimension attribute value and the at least one dataset presentation structure dimension attribute value; the method further comprising: rendering the dataset presentation structure including the overflow indicator for display on the computing device.

In some embodiments, determining the dataset presentation structure includes, if the dataset dimension attribute value exceeds the dataset presentation structure attribute value or exceeds the presentation structure attribute value by more than a threshold, determining that there is a data overflow, assigning a position in the first dimension to the data overflow at an edge of a scrollable region, and indicating the assigned position by adding the overflow indicator to the subset of the cells to define the overflow edge at the assigned position of the edge of the scrollable region.

In some embodiments, assigning a position in the first dimension to the data overflow includes assigning two positions in the first dimension to data overflows at two edges of a scrollable region in the first dimension, and indicating the assigned positions by adding overflow indicators to the subset of cells to define the overflow edges at the assigned positions of the edges of the scrollable region.

In some embodiments, the dataset presentation structure includes a relative location indicator to indicate a position or positions of the overflow edge or overflow edges relative to the entire first dimension, and optionally wherein the relative location indicator is rendered approximate to a dataset presentation structure margin. In some embodiments, the relative location indicator is a scroll bar. In some embodiments, the relative location indicator indicates either a horizontal or a vertical position or positions.

In some embodiments, determining the dataset presentation structure includes determining one or more columns to be fixed in the dataset presentation structure to be displayed adjacent to the overflow edge or overflow edges at the assigned positions of the edges of the scrollable region.

The method of some embodiments further comprises: determining a user navigation event; updating the dataset presentation structure and the dataset presentation structure dimension attribute value responsive to the user navigation event; in response to the updated presentation structure dimension attribute value and the user navigation event, updating the position of the data overflow or data overflows at the edge or edges of the scrollable region to define updated overflow edge or overflow edges; and rendering the dataset presentation structure including the updated overflow edge or overflow edges.

In some embodiments, the user navigation event comprises one or more of: a scroll event, or a resize event associated with resizing of the dataset presentation structure.

The method of some embodiments further comprises receiving a user selection input to determine a focus element within the dataset presentation structure, and wherein the overflow indicator is presented overlayed on the focus element.

In some embodiments, the dataset presentation structure is configured to receive user input for editing the at least part of the dataset. Some embodiments relate to a method comprising: transmitting computer executable instructions to a computing device, the computer executable instructions when executed by the computing device cause the computing device to perform the method of any one of the embodiments.

In some embodiments, the dataset presentation structure comprises a plurality of data row objects configured to represent a respective row of the plurality of rows of the tabular data. In some embodiments, each of the plurality of data row objects comprises an editing menu, the editing menu facilitating editing operations via the user interface with respect to each respective row of the tabular data. In some embodiments, the dataset presentation structure is configured to facilitate a drag and drop user interaction via the user interface to manipulate an order of the plurality of data row objects.

In some embodiments, the dataset presentation structure is configured to facilitate a drag and drop user interaction via the user interface to manipulate an order of the plurality of data column objects. The method of some embodiments, further comprises dynamically updating the overflow indicator responsive to the drag and drop user interaction.

In some embodiments, each data column object comprises a plurality of cell objects, each cell object of the plurality of cell objects being configured to represent a respective row data of the plurality of rows of the tabular data of the respective column; and wherein the plurality of cell objects are configured to receive user input for editing data in the plurality of cell objects.

Some embodiments relate to a dataset container comprising: a plurality of data grid columns, each data grid column of the plurality of data grid columns configured to correspond with a respective column of a plurality of columns of tabular data for presentation; and at least one navigation structure dimension attribute corresponding to a respective dimension of a dataset navigation structure; wherein the grid structure is configured to: wrap a dataset comprising a plurality of columns of tabular data to thereby provide a dataset dimension attribute value relating to the entire dataset and representing a size of a rendering of the dataset in a first dimension; and determining a dataset presentation structure corresponding to a portion of the dataset navigation structure, wherein dimensions of the portal correspond with respective dimensions of the display of the computing device, wherein determining the dataset presentation structure includes: calculating at least one dataset presentation structure dimension attribute value relating to the part of the dataset and representing a size of a rendering of the dataset presentation structure in a first dimension; and if the dataset dimension attribute value exceeds the dataset presentation structure attribute value or exceeds the presentation structure attribute value by more than a threshold, determining that there is a data overflow, assigning a position in the first dimension to the data overflow at an edge of a scrollable region, and indicating the assigned position by adding the overflow indicator to the subset of the cells to define the overflow edge at the assigned position of the edge of the scrollable region; and rendering the dataset presentation structure including the overflow indicator for display on the computing device.

Some embodiments relate to a computing device comprising: one or more processors; a display, a user input unit; and memory comprising computer executable instructions, which when executed by the one or more processors, cause the system to perform the method of any one of the embodiments.

Some embodiments relate to a computer-readable storage medium storing instructions that, when executed by a computer, cause the computer to perform the method of any one of the embodiments.

BRIEF DESCRIPTION OF DRAWINGS

FIG. 3A is a process flow diagram of a method of rendering data in tabular form, according to some embodiments;

FIG. 3B is a process flow diagram of a method of rendering data in tabular form and updating the rendering;

FIGS. 5A, 5B and 5C are screenshots of a user interface illustrating margin indication for a web-based dataset presentation structure, according to some embodiments;

FIG. 6 is a screenshot of a user interface illustrating an excerpt of tabular data editable via the user interface;

FIG. 8 is a screenshot of a user interface illustrating a rendered display structure comprising tabular data arranged in a dataset presentation structure.

DESCRIPTION OF EMBODIMENTS

Figure 1:
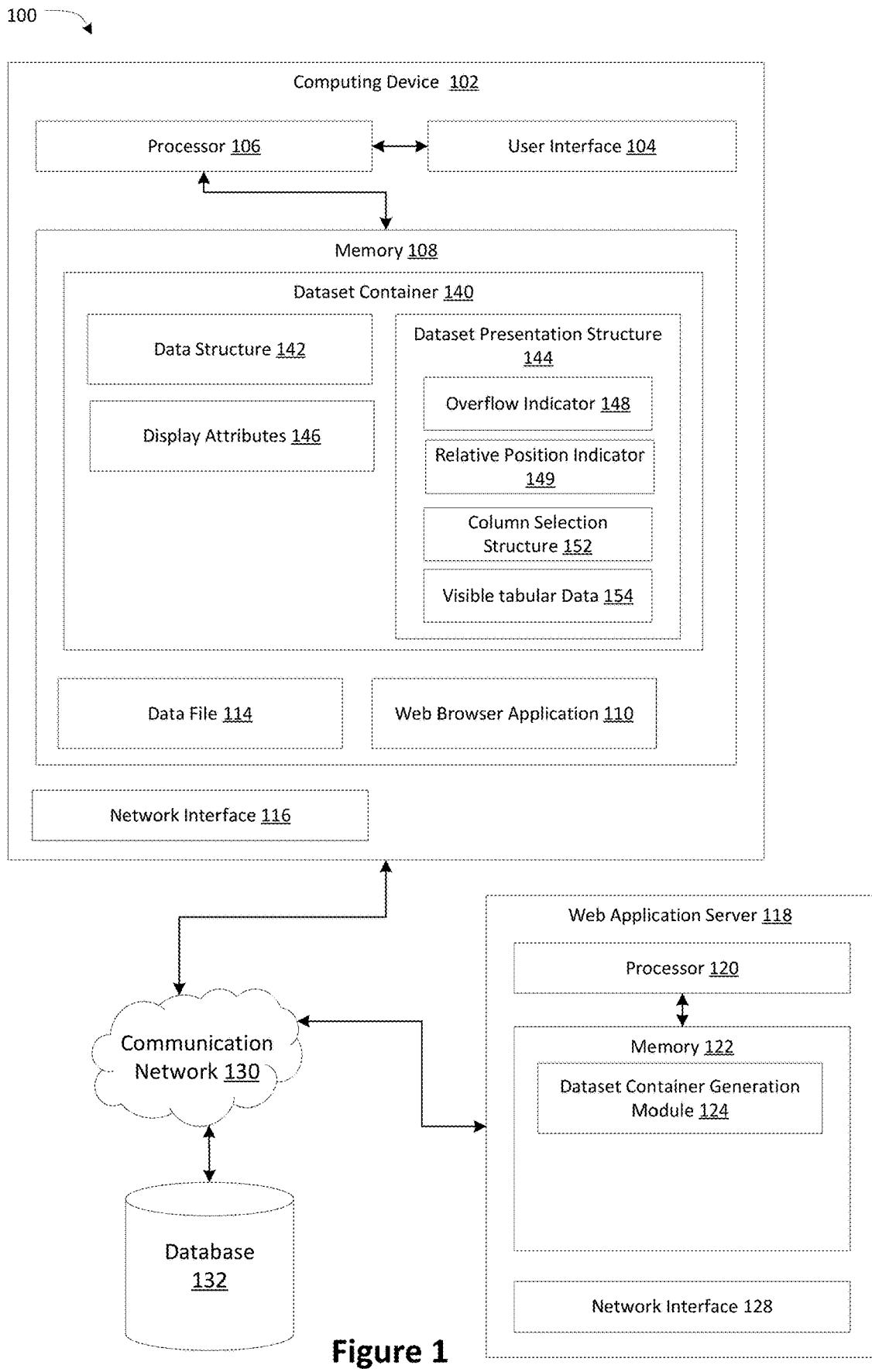
FIG. 1 is a block diagram of a system for web-based data presentation and modification, according to some embodiments.

Embodiments generally relate to web-based user interfaces for data presentation and/or data editing. In some embodiments, the embodiments allow the presentation of data in a dataset presentation structure. For example, the methods of embodiments may be performed by web browsers otherwise referred to as web browser applications. The web browsers may be running on mobile telephones, laptops, desktops, tablets, or other computing devices. Some embodiments may be agnostic to a source or structure of the data being presented or edited via the dataset presentation structure.

Presentation or modification of data, particularly tabular data comprising a relatively large number of columns and/or a relatively large number of rows, may require a significant amount of processing power and/or memory on computing devices. In particular, financial or accounting datasets may comprise a large number of rows and/or columns. Computing devices, in particular end-user computing devices such as smartphones, laptops, and desktops, may have limited processing capacity or memory available to facilitate the presentation or modification of such tabular data.

Computing devices may also have limited screen display areas, which can make displaying and editing relatively large tabular datasets cumbersome. For example, a limited screen display area may not be sufficient to allow a user to intuitively navigate a large tabular dataset while providing the end-user with some indication of which part or section of the tabular dataset is being displayed relative to the whole of the tabular dataset.

Described embodiments advantageously provide methods, systems, and computer-readable media that reduce the processing capacity and/or memory required to render or modify a large dataset. A dataset may comprise a dataset capable of being represented or visualised in a tabular form. A dataset in a tabular form may include records comprising a collection of fields or attributes obtained from one or more than one data source. The tabular dataset may comprise columns corresponding to each distinct field or attribute. A tabular dataset may comprise data capable of being presented in a dataset presentation structure. The dataset may comprise graph data that is representable in tabular form, for example, by designating a class of entity as the key value per row, so that there is one row per instance of the class, and representing each property of that class (or of instances thereof) as a column. The dataset presentation structure may comprise horizontal rows corresponding records in the tabular dataset and vertical columns corresponding to each field or attribute. The dataset presentation structure may comprise cells corresponding to each data value for each column associated with each row of the dataset. The embodiments also advantageously provide methods, systems, and computer-readable media that provide a user with more intuitive feedback as the user navigates a large tabular dataset, improving the ease of navigation and manipulation of large tabular datasets.

Some embodiments allow editing of a dataset via the web-based dataset presentation structure. Editing may include updating or changing a value in a cell or more than on cells of the dataset presentation structure. Some embodiments may allow an order of rows or columns of the dataset to be updated or edited via the dataset presentation structure, for example by a drag and drop operation. Some embodiments may allow deleting of rows or the creation of new rows in a dataset presented via a dataset presentation structure. Some embodiments may allow deleting of columns or the creation of new columns in a dataset presented via a dataset presentation structure.

Some embodiments provide the generation of a dataset presentation structure to allow the presentation or modification of tabular datasets. In some embodiments, the dataset presentation structure may be rendered on a web interface using semantic HTML structures. The semantic HTML structures according to the embodiments reinforce the semantics or meaning, of the information presented in the dataset presentation structure using meaningful semantic HTML tags. The semantic HTML tags implemented by the embodiments allow efficient reuse or modularisation of the disclosed methods or systems. The use of semantic HTML assists integration of the dataset presentation structures of the embodiments with assistive technology, including screen readers.

Figure 4A:
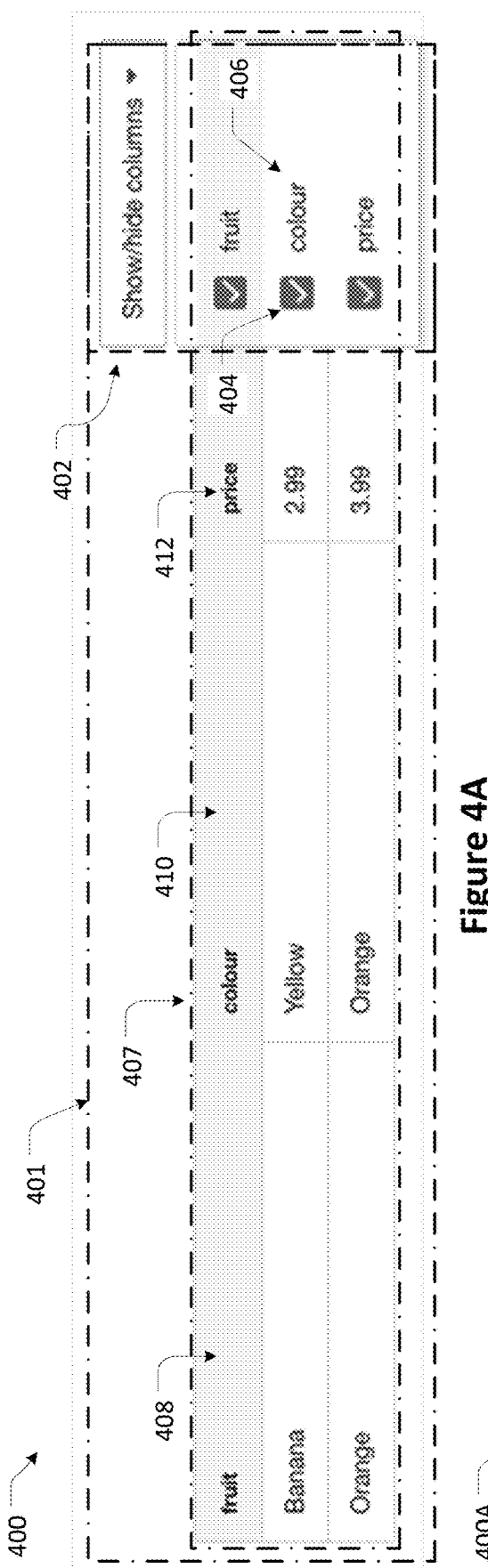
FIGS. 4A and 4B are screenshots of a user interface illustrating a column hiding operation for a web-based dataset presentation structure, according to some embodiments.
Figure 4B:
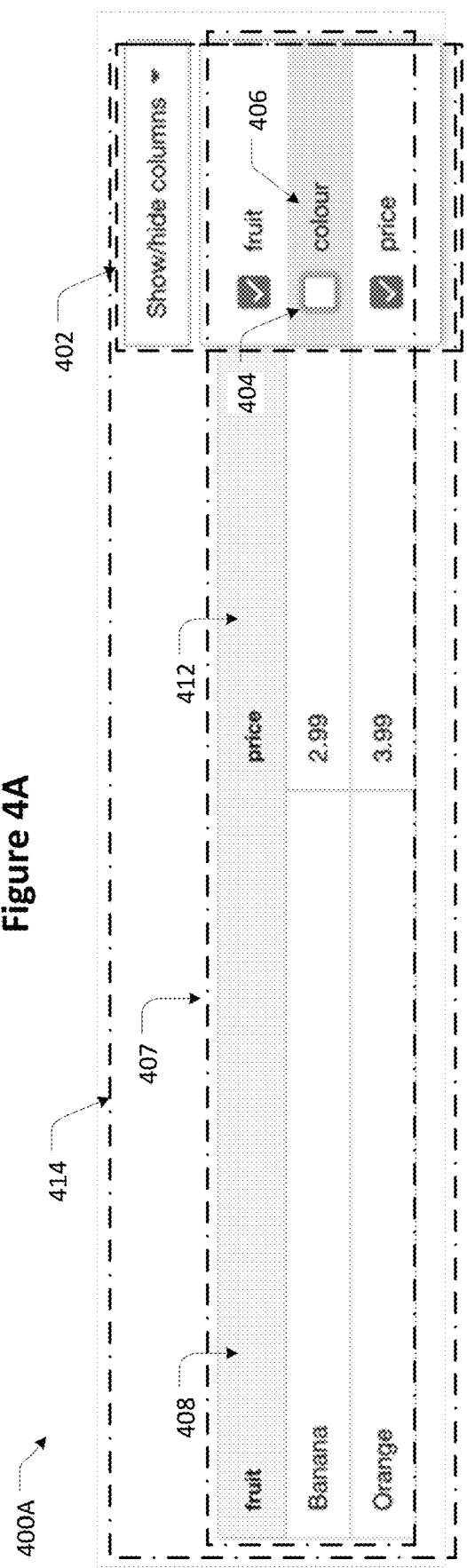

Some embodiments as illustrated in FIGS. 4A and 4B allow selective hiding of specific columns. The selective hiding (wherein hiding means excluding from display when the region of tabular data being displayed would include the hidden columns, were it not for the hiding) of specific columns may allow the exclusion of columns not of interest to a user while the user navigates through the dataset. In datasets with a large number of columns, some embodiments advantageously allow the user to reduce the number of columns occupying the display. The reduction in the number of columns on the display also reduces the memory and/or processing power requirements for displaying and/or navigating through a dataset on a web interface. Moreover, in some embodiments, selective hiding of specific columns is performed in a manner that reduces or negates the need to include the selectively hidden columns in a render tree structure associated with the web interface, thereby reducing the memory and/or processing power requirements for display and/or navigation.

Figures 5A, 5B:
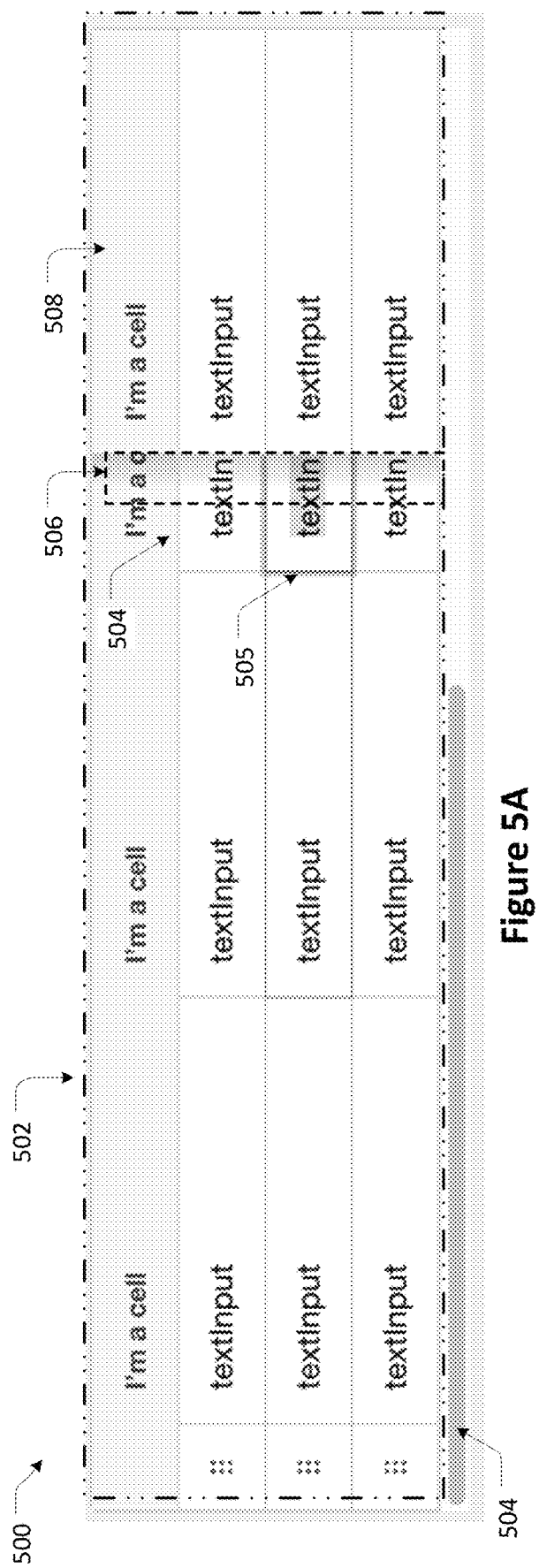

Some embodiments as illustrated in FIGS. 5A and 5B allow the presentation of tabular datasets using a dataset presentation structure or window with an overflow indicator and optionally also including a relative location/position indicator indicating the existence of overflow tabular data not rendered (i.e. visible) within a larger dataset structure. The overflow indicator provides to a user feedback regarding which part of a larger dataset a user is viewing. overflow indicator allows a user to efficiently navigate through a larger dataset using fewer navigation actions such as fewer redundant scroll actions, thereby reducing the processing power required to navigate through tabular datasets. In particular, for devices with smaller displays, the embodiments as illustrated in FIGS. 5A and 5B provide an efficient solution for navigating and/or manipulating tabular datasets, in particular tabular datasets with several columns and rows. The overflow indicator as illustrated in FIGS. 5A and 5B provides an intuitive indication within the cells themselves that there is a data overflow, thereby allowing meaningful display of excerpts of a large (i.e. with a size exceeding a space available for display/render) dataset. In some embodiments, the overflow indicator may comprise a shading element or a shade or a shadow indicating continuity of tabular data beyond the content rendered in a display.

In some embodiments, a dataset presentation structure comprising an overflow indicator may also allow drag and drop operations to reorder columns or rows of the dataset presented in the dataset presentation structure. The overflow indicator may advantageously provide feedback to a user to guide the drag and drop operations by providing to a user an overflow indication during the drag and drop operation.

In some embodiments, a dataset presentation structure comprising an overflow indicator may also comprise a focus ring highlighting or selecting one or more cells in the dataset presentation structure. In such embodiments, the overflow indicator may overlap with a part or whole of the focus ring. The overflow indicator when presented in combination with the focus ring may guide the selections of cells by an expansion or contraction of the focus ring within the dataset presented in the dataset presentation structure. FIG. 5A illustrates an example of a dataset presentation structure with an overflow indicator overlayed on a focus ring.

Some embodiments incorporate the React JavaScript library for providing web interfaces for the presentation or modification of data. Some embodiments provide HTML wrappers or containers to implement the functionality of the web interfaces according to the embodiments.

FIG. 1 is a block diagram of a system 100 for facilitating web-based data presentation and modification, according to some embodiments. System 100 comprises a computing device 102 in communication with a web application server 118 over a communications network 130. In some embodiments, system 100 also comprises a database 132 in communication with the computing device 102 and/or the web application server 118 via the communications network 130.

The computing device 102 comprises a user interface 104 capable of receiving inputs, such as requests, from one or more user(s) using the computing device 102, and capable of conveying outputs, such as information, to the user(s). The user interface 104 may comprise one or more user interface components, such as one or more of a display device, a touch screen display, a keyboard, a mouse, a camera, a microphone, buttons, for example.

The computing device 102 comprises at least one processor 106 in communication with a memory 108 and the user interface 104. Memory 108 may comprise one or more volatile or non-volatile memory types. For example, memory 108 may comprise one or more of random access memory (RAM), read-only memory (ROM), electrically erasable programmable read-only memory (EEPROM) or flash memory. Memory 108 is configured to store program code accessible by the processor(s) 106. The program code comprises executable program code modules. In other words, memory 108 is configured to store executable code modules configured to be executable by the processor(s) 106. For example, memory 108 comprises a web browser application 110. The web browser application 110 may be configured to cooperate with the user interface 104 to communicate requests or instructions received from a user via the user interface 104 to the web application server 118 or the database 132 and receive results or output based on the requests. Memory 108 may also comprise one or more data file(s) 114 comprising data suitable for displaying and/or editing in a dataset presentation structure according to the embodiments. The data file may be a text file or an MS Excel file, or any other file comprising structured data in a relational or table-based format.

Memory 108 may comprise a dataset container 140 to enable display and/or editing of data. The dataset container 140 comprises data structures, program code, attributes and visual user interface elements to enable the display or editing of data via the user interface 104. In some embodiments, the dataset container 140 may comprise a data structure 142 defining a structure for wrapping data capable of being presented or edited via a dataset presentation structure 144 using the user interface 104. In some embodiments, the data structure 142 may comprise a structure defined using semantic HTML or a structure defined by wrapping semantic HTML elements such as a 'td' semantic HTML node corresponding to a cell of a semantic HTML table. The data structure 142 may incorporate custom properties or attributes associated with the display or functionality of the various elements forming the data structure 142.

Semantic HTML may comprise HTML tags indicating a semantic meaning of components within the respective HTML tags. In some embodiments, the data structure 142 may also comprise a Document Object Model (DOM) or a DOM tree determined based on the structure defined using semantic HTML. The DOM tree may comprise a hierarchical organisation of elements or nodes capable of being presented using the dataset presentation structure 144.

The dataset presentation structure 144 comprises a data grid comprising tabular data for rendering, and instructions for how to render said tabular data (and associated elements). The tabular data for rendering is referred to as visible tabular data 154 to indicate that once rendered it appears in a user interface. The visible tabular data 154 comprises a visual representation or a user interface element or a part of a web page determined based on the data structure 142 and display attributes 146. The display attributes 146 may comprise one or more configurations or parameters that govern the appearance of various elements in the dataset presentation structure 144. In some embodiments, the display attributes 146 may include one or more Cascading Style Sheet (CSS) parameters. The display attributes 146 may include parameters relating to layout, colour, font, shading, transparency and other appearance-related parameters. In some embodiments, the display attributes 146 may be varied or determined based on user input received via user interface 104. In some embodiments, the visible tabular data 154 may be determined based on a render tree structure determined by parsing the data structure 142 and the related display attributes 146. The render tree structure may comprise visual elements of the dataset presentation structure 144 in the order in which they may be displayed via the user interface 104.

The dataset presentation structure 144 may also comprise elements or structure to enable navigation or display or editing of data. The dataset presentation structure 144 may include an overflow indicator such as a margin defining an overflow edge 148, or an overflow indicator element (described with reference to FIGS. 5A, 5B and 5C), and a column selection structure 152 (described with reference to FIGS. 4A and 4B).

In some embodiments, the computing device 102 may receive part of a dataset container 140 in response to a web request such as an HTTP request to the web application server 118. The computing device 102 further comprises a network interface 116 to facilitate communications with components of the system 100 across the communications network 130, such as the web application server 118, and/or database 132. The network interface 116 may comprise a combination of network interface hardware and network interface software suitable for establishing, maintaining and facilitating communication over a relevant communication channel.

The web application server comprises at least one processor 120 in communication with a memory 1122. Memory 122 comprises program code, program code libraries, program code dependencies, application programming interfaces, metadata and configuration data which are executable by the processor(s) 120 to generate a dataset presentation structure accessible by the computing device, provide the functionality to one or more computing device 102, communicate with the accounting database 132 and/or to function according to the described methods. The processor(s) 120 may comprise one or more microprocessors, central processing units (CPUs), application specific instruction set processors (ASIPs), application specific integrated circuits (ASICs) or other processors capable of fetching and executing instruction code.

Memory 122 may comprise one or more volatile or non-volatile memory types. For example, memory 122 may comprise one or more of random access memory (RAM), read-only memory (ROM), electrically erasable programmable read-only memory (EEPROM) or flash memory. Memory 122 is configured to store program code accessible by the processor(s) 120. The program code comprises executable program code modules. In other words, memory 122 is configured to store executable code modules configured to be executable by the processor(s) 120. The executable code modules, when executed by the processor(s) 120 cause the web application server 118 to perform certain functionality, as described in more detail below.

Memory 122 comprises a dataset container generation module 124. The dataset container generation module 124 comprises program code to generate a part of a dataset container for transmission to the computing device 102 in response to a request. In some embodiments, the dataset container generation module 124 may comprise an API (application programming interface) that may be invoked to generate a part of the dataset container 140.

The web application server 118 further comprises a network interface 128 to facilitate communications with components of the system 100 across the communications network 130, such as the computing device 102, and/or database 132. The network interface 128 may comprise a combination of network interface hardware and network interface software suitable for establishing, maintaining and facilitating communication over a relevant communication channel.

The communications network 130 may include, for example, at least a portion of one or more networks having one or more nodes that transmit, receive, forward, generate, buffer, store, route, switch, process, or a combination thereof, etc. one or more messages, packets, signals, some combination thereof, or so forth. Network 130 may include, for example, one or more of: a wireless network, a wired network, an internet, an intranet, a public network, a packet-switched network, a circuit-switched network, an ad hoc network, an infrastructure network, a public-switched telephone network (PSTN), a cable network, a cellular network, a satellite network, a fibre-optic network, some combination thereof, or so forth.

Figures 2A, 2B:
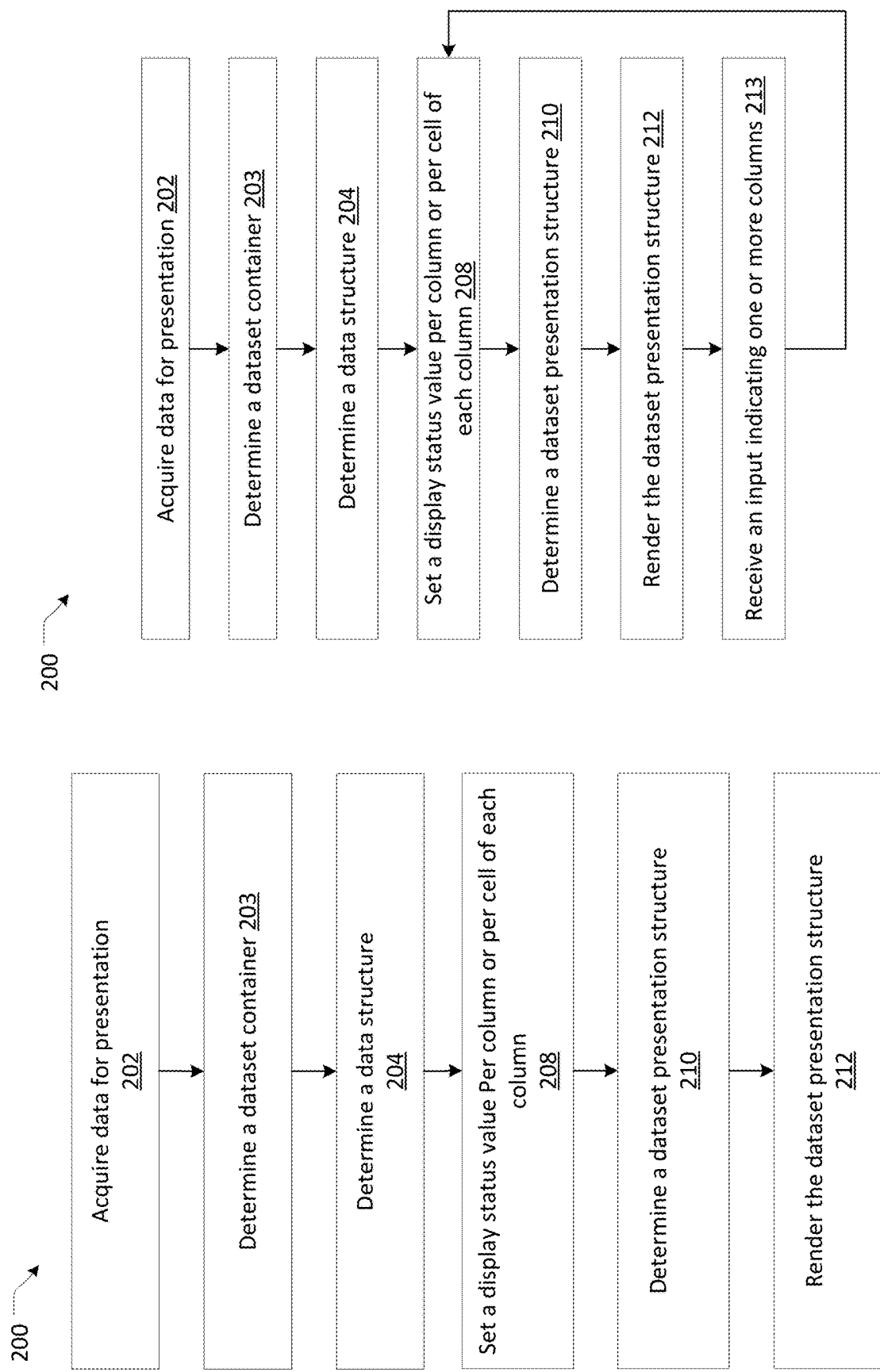
FIG. 2A is a process flow diagram of a method of performing a column hiding operation, according to some embodiments.
FIG. 2B is a process flow diagram of a method of performing a column hiding operation, according to some embodiments.

FIG. 2A is a process flow diagram of a method 200 of performing a column hiding or column display operations in rendering tabular data, according to some embodiments. FIG. 2B is a process flow diagram of the method 200 of FIG. 2A and further comprising process steps for updating the rendering in response to receiving an input from a user via the user interface on which the data is rendered. Correspondingly numbered steps are the same in both FIGS. 2A and 2B. FIG. 2B illustrates optional additional steps.

The method 200 may, for example, be implemented by the processor(s) 106 of the computing device 102 executing instructions stored in memory 108.

At 202, the computing device 102 determines or acquires a dataset for presentation via the user interface 104. The acquiring may be downloading from a web server, or may be reading from a memory location, or may be reading from a cache memory. The acquiring may be a combination of more than one of downloading from a web server, reading from a memory location, and reading from a cache memory.

The dataset may comprise data capable of being visualised in a tabular form comprising data arranged in columns and rows. The dataset may be obtained from a data file 114 stored in memory 108 of the computing device 102. The data file 114 may comprise tabular data in MS Excel, or a CSV (comma-separated values) file, or a TSV (tab-separated values) file, or XML (extendible mark-up language) file or data in the JSON (JavaScript Object Notation) format or any other file types suitable for storing tabular data.

At optional step 202, a web browser application 110 may access tabular data or a dataset from the data file 114 to determine the dataset for rendering in or on the user interface 104. In some embodiments, the dataset for presentation may be determined and/or acquired based on data received from the database 132 accessed by the computing device 102 via the communication network 130. In some embodiments, the dataset for presentation may be determined based on a dataset received by the computing device 102 from the web applications server 118 via the communication network 130. In some embodiments, the dataset for presentation may comprise data extracted or obtained from more than one sources, including more than one data file 114, or a combination of a data file 114 and database 132, or a combination of more than one database 132. In some embodiments, the web browser application 110 may access the dataset based on an API call returning data in a JSON format. At 203, the computing device 102 determines or composes a dataset container 140 for rendering the dataset acquired at 202. The dataset container 140 may comprise a data structure 142 comprising a plurality of columns objects. Each column object of the plurality of columns objects may be configured to correspond with a respective column of a plurality of columns of tabular data. Each column object may comprise a plurality of cell objects or cells. Each cell object of the plurality of cell objects may be configured to represent a respective row data of the plurality of rows of the dataset.

At 203, the computing device 102 determines the dataset container 140 for controlling rendering of the dataset. The dataset container 140 facilitates display or presentation of the dataset. The dataset may only be partially rendered. In other words, only a part of the dataset may be rendered in the user interface 104. However, the whole dataset is processed by the dataset container 140, in particular at step 204, determining the data structure 204 is performed for the whole dataset (i.e. the dataset in its entirety, errors notwithstanding). The dataset container 140 may comprise a data structure 142 comprising a plurality of data column objects. Each data column object of the plurality of data column objects may correspond to a respective column of the plurality of columns of the tabular data. For example, the data structure may be a document object model. In some embodiments, the data structure 142 may comprise a Document Object Model (DOM) tree, with each node of the DOM tree corresponding to an element capable of being displayed.

In some embodiments, the dataset container 140 may also comprise display attributes 146 relating to a display status value associated with each of the data column objects. In some embodiments, the display status value may be defined as a CSS (cascading style sheet) property. The dataset container 140 may also comprise program code to implement the column hiding or column display operations. For example, the dataset container 140 may include a Cascading Style Sheet (CSS) program code in a JavaScript program block to implement the column hiding or column display operations. The program code of the dataset container 140 may be configured to receive the display status values per column as input parameters to control the column hiding or column display operations. In some embodiments, the parameters may include an array or references or index associated with columns designation for hiding.

In some embodiments, the data structure 142 may comprise an HTML based data structure. In particular, in some embodiments the data structure 142 may comprise a semantic HTML, based data structure. The following snippet illustrates an example of a dataset laid out in using a semantic HTML data structure:

```
<table>
    <tr>
        <th>First name</th>
        <th>Last name</th>
    </tr>
    <tr>
        <td>John</td>
        <td>Doe</td>
    </tr>
    <tr>
        <td>Jane</td>
        <td>Doe</td>
    </tr>
</table>
```

In the above example, a beginning and end of the table are identified by the HTML tags <table> and </table> respectively. In the above example, a beginning and end of a record in the table are identified by the HTML tags <tr> and </tr> respectively. In the above example, a beginning and end of a single data element are identified by the HTML tags <td> and </td> respectively.

The dataset container 140 may also comprise display attributes 146 that relate to status or state or display properties of the various elements of the data structure. The display attributes 146 may include display attribute values or unique identifiers associated with each data column object. The unique identifier may allow each data column object (and thus each column within the dataset) to be uniquely identified and referred to in subsequent steps of method 200. The unique identifier may be assigned to each column at 202 or 203. The attributes, variables or properties may also include a column label or a column header describing the nature of data present in each column. For example, for a column storing first names, the column label or a column header value may be 'First Name'.

In some embodiments, a part of the dataset container 140 determined at 203 may be received from the dataset container generation module 124 of the web application server 118. The received part of the dataset container 140 may include a template for definition of the data structure 142 that may be adapted by the computing device 102 based on the structure of the data intended for presentation via the user interface 104.

The data structure 142 determined at 204 may be a document object model. The data structure determined at 204 includes a data column object per column of the acquired dataset. The form of the data structure at 204 may be, for example, a tree. The data structure determined at 204 contains the dataset acquired at 202. The dataset presentation structure determined at 210 may be a portion of the dataset, and instructions to an application such as a web browser for rendering said portion. The dataset presentation structure may include an HTML node referred to using a React API reference.

At 208, the computing device 102 sets a display status value (stored as display attributes 146) to each data column object or alternatively to each cell of a data column object. The display status value may be based on a predetermined default set of display status values. In some embodiments, all the cells of each of the columns may be allocated a 'true' display value or an equivalent value indicating all columns are set to be displayed. In some embodiments, the display status values may be allocated based on values predefined in the web browser application 110, such as based on web browser cookies.

At 210 the computing device 102 determines a dataset presentation structure, which may be an aggregation of the content for rendering along with instructions for how to render the content. Thus, cells of columns for which an associated display attribute value indicates that the cells should be hidden or equivalent (i.e. not rendered) are present in the data structure 142 determined at 204, but excluded from the dataset presentation structure determined at 210. The dataset presentation structure may comprise a render tree structure based on a document object model and a CSS object model. For example, at 210 the computing device 102 wraps or encapsulates the dataset 202 with the data structure 142 determined at 204 to determine a dataset presentation structure 144 including visible tabular data 154 which is an excerpt of the data structure 142 that is to be rendered in the user interface 104. The visible tabular data 154 may comprise a visual user interface element or a part of a rendered web page including data in a data grid or tabular structure as exemplified in FIGS. 4A and 4B. The visible tabular data 154 may be determined based on a render tree of visual elements determined based on the data structure 142.

In some embodiments, the dataset presentation structure 144 may also comprise a column selection structure to receive an input indicating one or more of the columns through the user interface 104. The column selection structure may include column labels or headers or unique identifiers or indexes associated with columns in the dataset presentation structure to allow a user to select a subset of columns for display or indicate a subset of columns for hiding.

At 212, the computing device 102 renders the dataset presentation structure 144 into or on the user interface 104 for viewing by a user. The rendering may be performed per an update or a refreshing or a loading of a web page or a part of a web page presented via the web browser application 110.

FIG. 2B illustrates an embodiment. FIG. 2B illustrates an efficiency associated with the method of FIG. 2A, which is that by determining a data structure 142 at 204 for each column in the dataset, and utilising the display status value per cell of each column (which may be a CSS attribute such as display: none) to exclude certain of the columns from the visible tabular data 154 (that is, exclude columns from the dataset presentation structure), only a subset of method 200 need be performed in response to receiving an input indicating one or more columns at 213.

At 213, the computing device 102 may receive a column selection input from a user designating a set of data columns for hiding from the user interface 104 or including previously hidden columns in the user interface 104. The column selection input may designate one or more data columns for hiding from the dataset presentation structure being rendered on the user interface 104. The column selection input may also designate one or more previously hidden columns to be included in the dataset presentation structure being presented on the user interface 104.

In some embodiments, the data structure 142 may comprise a unique numeric identifier or an index or a label associated with each column of the dataset. The column selection input from a user may be mapped to an array of unique numeric identifiers associated with data columns intended to be hidden or displayed by the user.

In some embodiments, the dataset presentation structure 144 may further comprise a column selection structure 152. The column selection structure 152 may allow a user to designate the set of data columns for hiding from or displaying on the visible tabular data 154 displayed on the user interface 104. In some embodiments, the column selection structure 152 may comprise labels or headers associated with each data column and a checkbox or a radio button allowing a user to designate a set of data columns for hiding. A hidden column is excluded from the display presentation structure determined at 210. However, the column selection structure 152 may include an element corresponding to the excluded column(s) so that a user can execute an input via the element in order to unhide the column.

At 208, the computing device 102 sets the display status values (stored as display attributes 146) of the dataset container 140 to hide or display specific data columns based on the input received at 213. The display status values may include updating CSS properties associated with each designated data columns or alternatively with each cell of the designated data columns stored in the dataset container 140.

In some embodiments, 208 may include iterating over an array comprising an index or unique identifier associated with columns designated at 213 and updating a CSS property stored as a display attribute 146 associated with each data column object or each cell of each data column object within the data structure 142. In some embodiments, the CSS property '{display: none}' may be used to designate hiding of each cell of a column in the visible tabular data 154. In some embodiments, removing the CSS property {display: none}' may be used to display a previously hidden column. In some embodiments, the CSS property may be associated with each cell of the visible tabular data 154. The '{display:none}' example is based on the current CSS technology, however embodiments may leverage an equivalent property in an alternative technology or in a future version of the CSS technology. In some embodiments, 208 may include iterating over each cell of each column designated for hiding and updating the respective display attribute (for example a CSS display property value) to indicate that the respective cell be hidden (for example by setting the CSS property value of each cell of the designated column to {display: none}) in the visual tabular data 154.

At 210, the dataset presentation structure 144 rendered at 212 is updated (i.e. determined again) based on the updates in display status values at 208. Update to the dataset presentation structure 144 may comprise determination of an updated render tree structure based on the data structure 142 with the updated display status values in the display attributes 146. At 212 the updated render tree structure is rendered in or on the user interface 104.

The hidden column may be retained in a document object model (DOM) within the data structure 142 while not displaying the hidden columns in the rendering.

In some embodiments, the update of the dataset presentation structure 144 at 210 may be further optimised using memoization. In particular, some embodiments may incorporate a React function React.memo (https://reactjs.org/docs/react-api.html #reactmemo) to limit the update at 210 to only components of the data presentation structure 144 that relate to display status values updated at 208. Memoization allows the reduction of unnecessary rendering operations associated with components of the dataset presentation structure 144 that have not been changed by variation in any associated display attributes 146. Memoization, therefore, improves the performance of the determination and update of the dataset presentation structure 144 by reducing the consumption of processing power and/or memory. While a column of the data structure 142 remains hidden, it is retained in a Document Object Model while not being included in the display presentation structure 144 and thus not rendered.

In some embodiments, a column selection input of 213 may be received at an arbitrary timing after one or more executions of steps 208 to 213, allowing iterative updates to the dataset presentation structure 144 based on user input.

Dataset acquired at 202 may comprise relational data, i.e. data in rows and columns. The dataset acquired at 202 may comprise data suitable for arrangement in rows and columns but not arranged in rows and columns. For example, the acquired dataset may be a comma-separated list or a dataset organised in the JSON format. Dataset acquired at 202 may include graph data, wherein the method includes transforming the graph data into relational data for rendering. The data structure determined at 203 may be a document object model. The data structure determined at 203 includes a data column object per column of the acquired dataset. The form of the data structure at 203 may be, for example, a tree. The data structure determined at 204 contains the dataset acquired at 202. The dataset presentation structure determined at 210 may be a portion of the dataset, and instructions to an application such as a web browser for rendering said portion. The dataset presentation structure may be a render tree. The render tree may combine a document object model and a CSS object model. The dataset presentation structure may include an HTML node referred to using a React API reference.

FIG. 3A is a process flow diagram of a method 300 of rendering data in tabular form according to an embodiment, including adding an overflow indicator to the cells to define an overflow edge. The overflow edge is a visual indicator that there is an overflow in the table, i.e. that the full extent of the table in a dimension (for example, width dimension) is not being rendered. FIG. 3B is a process flow diagram of the method 300 of FIG. 3A and further comprising process steps for updating the rendering in response to a user navigation event. Correspondingly numbered steps are the same in both FIGS. 3A and 3B, save for step 308 which in FIG. 3B is repeated and thus becomes an update step after the first iteration.

The method 300 may, for example, may be implemented by the processor(s) 106 of the computing device 102 executing instructions stored in memory 108. The method 300 allows the determination of an overflow indicator providing an indication within the rendered cells that there is an overflow in the rendered tabular data i.e. that in a specific dimension (i.e. width) the full extent of the tabular data is not rendered in the user interface 104 of the computing device 102. It is noted that an overflow in a first dimension may be indicated by an overflow indicator in a second dimension (i.e. an overflow in the width/horizontal direction is indicated by a vertical overflow indicator such as a shadow effect from a vertical line or edge). The overflow indicator may indicate the existence of additional columns or overflow columns (and/or a portion of an additional column or overflow column) towards a left or right horizontal direction with respect to a visible tabular data 154. In some embodiments, the overflow indicator may indicate the existence of additional rows or overflow rows (and/or a portion of an additional row or overflow rows) towards a top or a bottom vertical direction with respect to a visible tabular data 154.

At optional step 302, the computing device 102 acquires a dataset for presentation via the user interface 104. In some embodiments, step 302 of method 300 may be identical to step 202 of method 200 of FIG. 2. The acquiring may be downloading from a web server, or may be reading from a memory location, or may be reading from a cache memory. The acquiring may be a combination of more than one of downloading from a web server, reading from a memory location, and reading from a cache memory.

In some embodiments, step 304 of method 300 may be identical to step 203 of method 200, to which reference in the above description of FIG. 2A should now be made.

The dataset container 140 also comprises at least one dataset dimension attribute value (stored as a display attribute 146) corresponding to a respective dimension of the dataset and calculated at 306. The dataset dimension attribute value represents a size of a rendering of the dataset in a first dimension. The dataset dimension attribute value may be calculated by applying logic for transforming the data structure (i.e. the document object model) into a rendered form to predict or emulate an extent in a first dimension of the full table were it to be rendered. The dataset dimension attribute value may be dependent upon a cascading style sheet (CSS) used to determine how different objects and data among the dataset are rendered i.e. displayed on the user interface 104. The calculating does not render the data. The calculating generates a measurement of the dataset in a first dimension, the measurement being a size (e.g. a width) of the table in rendered form. The dataset dimension attribute value may be in pixels or some other unit of measurement. The dataset dimension attribute value may include a width attribute of the navigation structure in terms of the number of pixels that the navigation structure could potentially occur if all the data columns in the table were to be displayed.

Dataset acquired at 302 may comprise relational data, i.e. data in rows and columns. The dataset acquired at 302 may comprise data suitable for arrangement in rows and columns but not arranged in rows and columns. For example, the acquired dataset may be a comma-separated list. Dataset acquired at 302 may include graph data, wherein the method includes transforming the graph data into relational data for rendering. The data structure determined at 304 may be a document object model. The data structure determined at 304 includes a data column object per column of the acquired dataset. The form of the data structure at 304 may be, for example, a tree. The data structure determined at 304 contains the dataset acquired at 302. The dataset presentation structure determined at 308 may be a portion of the dataset, and instructions to an application such as a web browser for rendering said portion. The dataset presentation structure may be a render tree. The render tree may combine a document object model and a CSS object model. The dataset presentation structure may include an HTML, node referred to using a React API reference.

At 308, the computing device 102 determines a dataset presentation structure 144 for data structure 142 and determines a one or more dataset presentation structure dimension attribute values. Step 308 may also include initialisation or allocation of the at least one dataset presentation structure dimension attribute value (stored as a display attribute 146) based on the wrapping of the dataset in the data structure 142. The dataset presentation structure 144 is data from the dataset for rendering and instructions determining how said data are to be rendered. At least one dataset dimension attribute value relates to the whole dataset and may be a width (e.g. in pixels) necessary to render all of the data columns defined in the data structure 142. The width may be represented in terms of a number of pixels. For example, if a data structure 142 comprises 40 columns and 20 pixels are necessary to render each column, the dataset dimension attribute value relating to the dataset may be initialised to 800 pixels, regardless of the space within which to render the dataset in the user interface 104. Alternatively, the width may be represented in relative units, such as in percentage values with respect to a size or dimension of a display of the user interface 104 of the computing device 102.

At 308, the computing device 102 determines a dataset presentation structure 144 including tabular data 154 which is an excerpt of the acquired dataset. The dataset presentation structure 144 may be, for example, a render tree. The dataset presentation structure 144 implements the data structure 142 and may incorporate render instructions from a cascading style sheet. The tabular data 154 may conform to the limitations of a display portion (i.e. a frame) of the user interface 104. The limitations may include a size of a screen or window of the user interface 104. In some embodiments, the tabular data 154 may include a portion or a part of the data set wrapped in the data structure 142. The tabular data 154 in the dataset presentation structure 144 may be generated by combining a document object model 142 with a cascading style sheet object model into a render tree. The tabular data 154 is a subset of columns and/or a subset of rows of the acquired dataset (i.e. a subset of cells) and specifically is a subset that will be rendered onto the user interface 104. The tabular data 154 may therefore be referred to as visible tabular data or displayed tabular data, wherein visible indicates that it will be made visible within the user interface at rendering 312. The dataset presentation structure 144 is the data that will be displayed and instructions for how to render said data. The dataset presentation structure 144 comprises the visible tabular data 154, an overflow indicator 148, and may also comprise a relative position/location indicator 149. The relative position indicator 149 in some embodiments may comprise a vertical and/or horizontal scroll bar indicating a relative position of the visible tabular data 154 with respect to the entirety of the dataset acquired at 302. In some embodiments, the visible tabular data 154 may include a fraction of a column or a row of a dataset. For example, as illustrated in screenshot 500 of FIG. 5, the visible tabular data 154 may include three columns and a fraction of a column, such as half of a column.

At 310, which is illustrated as a separate step from 308 for emphasis but is part of the determining of the dataset presentation structure, an overflow indicator 148 is added to the dataset presentation structure to define an overflow edge. The overflow edge is defined insofar as when the dataset presentation structure 144 is rendered the overflow edge is visible i.e. detectable by a user. The overflow indicator 148 is within the cells of the visible tabular data 154. The overflow indicator 148 is added in dependence upon satisfaction of a condition. The condition may be that the dataset dimension attribute value exceeds the dataset presentation structure attribute value, or exceeds the dataset presentation structure attribute value by more than a predefined threshold. Thus, if the notional width of the entire dataset (were it to be rendered) exceeds the width of visible tabular data 154 being rendered based on the constraints of the user interface 104, then the overflow indicator 148 is required. The overflow indicator may be, for example, a graded shadowing at a boundary in the first dimension (i.e. along a line orthogonal to the first dimension in the plane of the display). The boundary may be the boundary of the visible tabular data 154. Alternatively, the boundary may be the boundary of a scrollable region within the visible tabular data 154. The overflow indicator 148 may be at two boundaries, for example a left edge and a right edge of the visible tabular data 154, or a left edge and a right edge of a scrollable region. The visible tabular data 154 may comprise only a scrollable region, or may aggregate a scrollable region and a fixed region.

Optionally, the display attributes 146 may also comprise at least one dataset presentation structure dimension attribute value corresponding to a respective dimension of the visible tabular data 154. The at least one dataset presentation structure dimension attribute value may include a width attribute and/or height attribute corresponding to the width and/or height of the visible tabular data 154. The display attributes 146 may also comprise a visible tabular data position attribute indicating a relative position of the visible tabular data 154 within the dimensions required to present all the columns of the dataset wrapped in the data structure 142. The visible tabular data position attribute may be a relative location indicator 149. Alternatively, the visible tabular data position attribute may be represented by or manifest as the relative location indicator. That is, the visible tabular data position attribute may be an artefact of the rendering, such as a relative location indicator (scroll bar), or may be a value/attribute/parameter according to which a relative location indicator is determined. The visible tabular data position attribute may indicate a position or positions of an overflow edge or edges relative to a notional full extent of the acquired dataset in a dimension e.g. width. In some embodiments, visible tabular data position attribute may include a vertical and/or horizontal offset value indicating a relative position of the visible tabular data or a specific region thereof such as a scrollable region within the dataset dimension attribute value. In some embodiments, the visible tabular data 154 may be initialised with a CSS styling property 'overflow-x: auto' to enable horizontal scrolling. In some embodiments, the visible tabular data may allow both horizontal and vertical scrolling.

In some embodiments, the relative location indicator may at least partially indicate a relative horizontal location of the visible tabular data 154 or a specific region thereof such as a scrollable region. In such embodiments, the overflow indicator may include a left and/or right overflow indicator indicating the existence of additional columns not rendered in the user interface 104, or indicating the existence of parts of additional columns not rendered in the user interface 104.

In some embodiments, 310 may comprise determination of a 'scroll left' value associated with the visible tabular data 154 or a specific region thereof such as a scrollable region. The 'scroll left' value may be determined based on a horizontal offset position attribute value comprising a horizontal position of the visible tabular data 154 or a specific region thereof such as a scrollable region with respect to a first column of the dataset. For example, if each column is allocated 10 pixels, and the visible tabular data 154 or a specific region thereof such as a scrollable region comprises the dataset from column 3 onwards, then the visible tabular data 154 or a specific region thereof such as a scrollable region may be assigned a horizontal offset position attribute value (scroll left value) of 20 pixels associated with columns 1 and 2 not rendered. Similarly, if the dataset from column 1 onwards is to be rendered, then the visible tabular data 154 or a specific region thereof such as a scrollable region may be assigned a horizontal offset position attribute value (scroll left value) of 0 pixels.

For example, if the horizontal offset position attribute value indicates that there is a data overflow in the table so that the visible tabular data 154 is horizontally offset from a notional left edge of the entire dataset, then the overflow indicator may include a left horizontal overflow indicator as exemplified in FIG. 5B. Similarly, if a sum of the horizontal offset position attribute value (scroll left value) of the visible tabular data 154 and the presentation structure dimension attribute value is determined to be less than a notional width of the entire dataset (stored as a dataset dimension attribute value), then the overflow indicator may include a right horizontal overflow indicator as exemplified in FIG. 5A.

In some embodiments, the determination of the overflow indicator 148 may further comprise the determination of coordinates within the visible tabular data for positioning the overflow indicator 148 based on the visible tabular data (or a specific region thereof such as a scrollable region) dimension and/or position attributes. In some embodiments, the determination of the overflow indicator 148 may further comprise the determination of width or height of the overflow indicator 148 based on the visible tabular data 154's dimension and/or position attributes.

In some embodiments, the visible tabular data 154 may comprise one or more pinned or fixed columns and a scrollable region, as illustrated in FIGS. 5A and 5B. Display attributes 146 may comprise boolean attributes or properties indicating existence of pinned columns. For example, an attribute 'hasPinnedFirstColumn' when set to true may indicate that a first column of the visible tabular data 154 is pinned. An attribute 'hasPinnedLastColumn' when set to true may indicate that a last column of the visible tabular data 154 is pinned. A pinned column may not be capable of being hidden in response to scroll or navigation events.

Positioning of the overflow indicator may account for the one or more pinned or fixed columns. For example, if in an embodiment the 'hasPinnedFirstColumn' attribute is set to true, an overflow indicator positioned in a left region of the visible tabular data 154 may be offset to not overlap with a column pinned to the left as exemplified in FIG. 5B. Similarly, if in an embodiment the 'hasPinnedLastColumn' attribute is set to true, then an overflow indicator positioned in a right region of the visible tabular data 154 may be offset to not overlap with a column pinned to the right as exemplified in FIG. 5A.

In some embodiments, an implementation of a Global State Management System or API such as the React Context APIpresentation structure dimension attribute, or the attributes storing dimensions associated with the data structure 142. The Global State Management System or API may allow exchange of attribute information or properties across the various components of the dataset container 140 without the need to manually pass or transmit the properties from one component to another. In some embodiments, alternative Global State Management systems such as Redux, mobx, Recoil, or custom hooks may be used to implement the Global State Management System to manage and keep track of the various display attributes.

At 312, computing device 102 renders the dataset presentation structure 144 on the user interface 104 of the computing device 102.

FIG. 3B illustrates a further step 314 and a variant of step 308. At 314, the computing device determines a user navigation event within the user interface 104. The user navigation event may be initiated by a keyboard stroke, or a touch screen interaction, or a mouse click, or movement of a scroll bar or a click on a scroll button, for example. The user navigation event may include a resizing of the rendered dataset presentation structure as part of a resizing of a web browser window comprising the rendered dataset presentation structure. One or more event listeners or scroll event listeners attached to the dataset container 140 may trigger the execution of functions or program code to calculate or update the presentation structure dimension attribute values at 308 responsive to a user navigation event at 314. In some embodiments, step 314 may repeatedly occur as part of a prolonged or extended navigation event such as a continuous scroll event. In such embodiments, step 308 including updating the presentation structure dimension attribute values and steps 310 and 312 may repeatedly occur to dynamically update and render the overflow indicator responsive to the prolonged or extended navigation event. The event listeners of the dataset container 140 may be detached or deactivated when dynamic changes or updates to the overflow indicator are not required, such as when a web page including the dataset presentation structure 144 is updated.

In some embodiments, a React useLayoutEffect hook (https://reactjs.org/docs/hooks-reference.html#uselayouteffect) may be used to configure the dataset container 140 to detect navigation events, such as a native web scroll events. The useLayoutEffect hook may be triggered when a dataset presentation structure 144 is first rendered to perform one or more of: calculate initial presentation structure dimension attribute values, attach an event listener such as a scroll event listener to one or more components of the dataset presentation structure 144, calculate dimensions of the relative position indicator and apply a predefined styling to the dataset presentation structure 144.

Responsive to the user navigation event of 314, at 308, the computing device 102 updates the display attributes 146 relating to the dataset presentation structure dimension attribute value to reflect an outcome of the navigation event, and optionally also a visible tabular data position attribute. For example, if a navigation event comprises moving a scrollable region in a horizontal rightward direction, then the horizontal offset attribute value (scroll left value) may need to be accordingly incremented based on the navigation event.

Based on the navigation event, the dataset presentation structure may need to be updated or varied to show a portion of the dataset by re-execution of the previous step 308 based on the updated display attributes 146. With a variation in the portion of the dataset presented in the dataset presentation structure, it may be necessary to update the overflow indicator by re-execution of step 310. Therefore, after an update to the display attributes 146 at 308, execution of method 300 may continue at 308 with an update to the dataset presentation structure, followed by an update to the overflow indicator at 310 and a rendering of the updated dataset presentation structure at 312.

For example, if the navigation event of 314 comprises navigation to a horizontal right end of the dataset (rightmost column of the dataset), then an overflow indicator previously determined at 310 indicating an overflow of additional columns to the right (illustrated in FIG. 5A) may need to be updated to an overflow indicator indicative of an overflow of additional columns to the left ( ) of the visible tabular data. In some embodiments, updates to the display attribute 146 may be performed by methods or function calls initiated by the event listeners associated with one or more components of the dataset presentation structure 144.

FIGS. 4A and 4B are screenshots of user interfaces illustrating a column hiding operation for a dataset presentation structure, according to some embodiments. FIG. 4A illustrates a screenshot 400 from a display of the user interface 104 of the computing device. Screenshot 400 comprises a rendered dataset presentation structure 401 comprising visible tabular data 407 with a plurality of data columns. The data columns include columns 408, 410 and 412 corresponding to fruit, colour and price columns respectively. Within the rendered dataset presentation structure 401 is a column selection structure 402 that allows the selection of columns for display or hiding by reference to checkbox 404 and column labels 406. In other embodiments, the column selection structure 402 may alternatively include other suitable mechanisms for selection of columns or a set of columns, such as checkboxes. In screenshot 400, all the checkboxes corresponding to each column (fruit, colour and price) have been checked and accordingly, the rendered dataset presentation structure 401 comprises each of the columns fruit, colour and price.

In screenshot 400A, the checkbox 404 corresponding to the colour data column object has been unchecked. Accordingly, screenshot 400A comprises an updated rendering of the dataset presentation structure 414 which does not include column 410 corresponding to colour. A user input received through the column selection structure 402 triggers the selective hiding of the designated colour column by updating a display attribute value associated with the colour column 410 to thereby hide the colour column 410 in screenshot 400A. The display status in some embodiments may include a display status cascading style sheet property associated with each column or in some embodiments a display status cascading style sheet property associated with each cell within a particular column. The selective hiding responsive to the column selection input results in a re-rendering of at least a part of the dataset presentation structure 414. A hidden column is retained in a document object model (DOM) of a corresponding data structure 142. However, the hidden columns are not retained in a render tree of the dataset presentation structure 414. Exclusion of the hidden columns from a render tree of the dataset presentation structure 414 improves the performance of user interactions with the dataset presentation structure 414 while reducing the requirements for memory and processing power for rendering the dataset presentation structure 414. A column selection input for displaying a previously hidden column initiates retrieval of the previously hidden column from the DOM for rendering as part of the rendered dataset presentation structure. The embodiments may implement memoisation to improve the performance of the column hiding and display operations.

Figures 5C, 6:
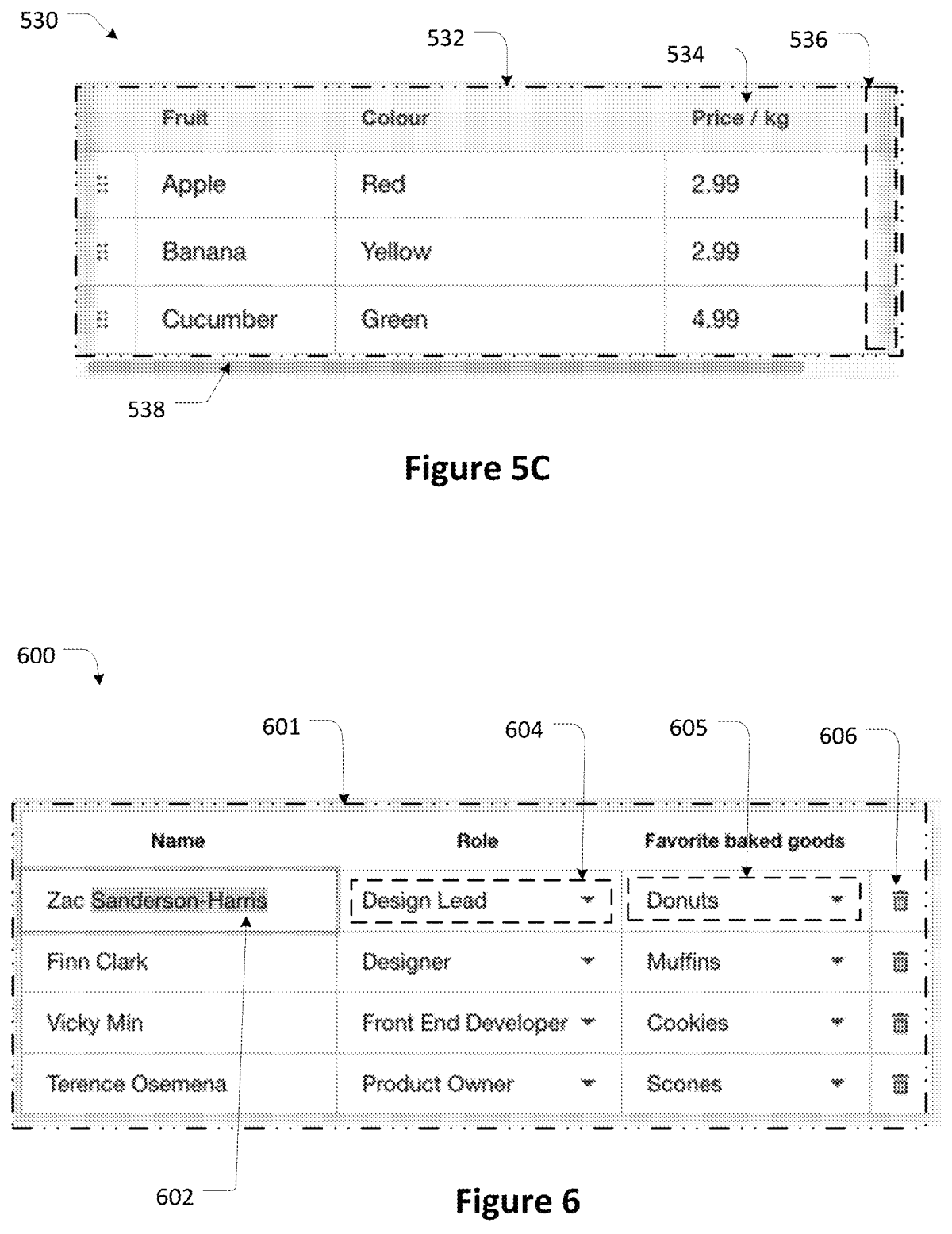

FIGS. 5A, 5B and 5C are screenshots of a user interface illustrating an example of an overflow indicator for a dataset presentation structure, according to some embodiments. FIG. 5A illustrates a screenshot 500 from a display of the user interface 104 of the computing device 102. Illustrated in screenshot 500 is a dataset presentation structure 502 comprising tabular data from an acquired dataset arranged in a data structure. Also illustrated in screenshot 500 is an overflow indicator 506 at one horizontal end of the dataset presentation structure 502 indicating the existence of additional columns that are not currently displayed in the dataset presentation structure 502 to the right of column 504. The overflow indicator 506 in this example is a shading overlayed on column 504. Also illustrated in screenshot 500 is a focus element or a focus ring 505 that corresponds to a cell or a group of cells selected by a user. The overflow indicator 506 may be overlayed on top of the focus element 505 as illustrated in screenshot 500.

Also illustrated in screenshot 500 is a pinned or fixed column 508 which remains pinned as a user navigates through the various columns of the dataset. Navigation input may be received through a scrollbar 504 allowing a user to horizontally navigate through a large number of columns while using a limited sized display of the user interface 104.

Screenshot 510 of FIG. 5B illustrates another example of an overflow indicator 512 for a web-based dataset presentation structure, according to some embodiments. Screenshot 510 illustrates a dataset presentation structure 516 comprising overflow indicators 512 and 522. The overflow indicator 512 indicates the existence of additional columns to the left of column 514 that are not currently displayed in the dataset presentation structure 516. The overflow indicator 522 indicates the existence of additional columns to the right of column 516 that are not currently displayed in the dataset presentation structure 516. Screenshot 510 also illustrates a pinned or fixed column 520 and a relative location indicator 518 in the form of a scroll bar to receive navigation input from a user.

The overflow indicators 512, 522 and 506 provide an intuitive indication of the existence of additional columns to a user allowing a user to navigate larger datasets with a display in the user interface 104 that may not be large enough to display an entire large dataset. The overflow indicators 512 and 506 are also dynamically updated in response to any user navigation or scroll or visible tabular data resizing events.

FIG. 5C illustrates a screenshot 530 from a display of the user interface 104 of the computing device 102. Illustrated in screenshot 500 is a rendering 532 of a dataset presentation structure comprising tabular data from an acquired dataset arranged in a data grid structure. Also illustrated in screenshot 530 is an overflow indicator 536 at one horizontal end of the rendering 532 indicating the existence of additional columns that are not currently displayed in the rendering 532 to the right of column 534. In some embodiments, the overflow indicator may alternatively indicate the existence of additional rows above or below rows in a rendering of a dataset presentation structure.

FIG. 6 illustrates a screenshot 600 from display of the user interface 104 of the computing device 102. Illustrated in screenshot 600 is a rendered dataset presentation structure comprising an excerpt of tabular data from an acquired dataset arranged in a data grid structure or a tabular structure. The excerpt 601 comprises cells or elements, such as element 602 that comprises free text capable of being edited or updated by a user via the user interface 104. The excerpt 601 comprises cells or elements, such as elements 604 and 605 that are capable of being edited by selection from a predefined list associated with the element or cell. The rendered dataset presentation structure also comprises a delete button 606 associated with each entry in the excerpt to allow a record to be deleted by a user.

Figures 7, 9:
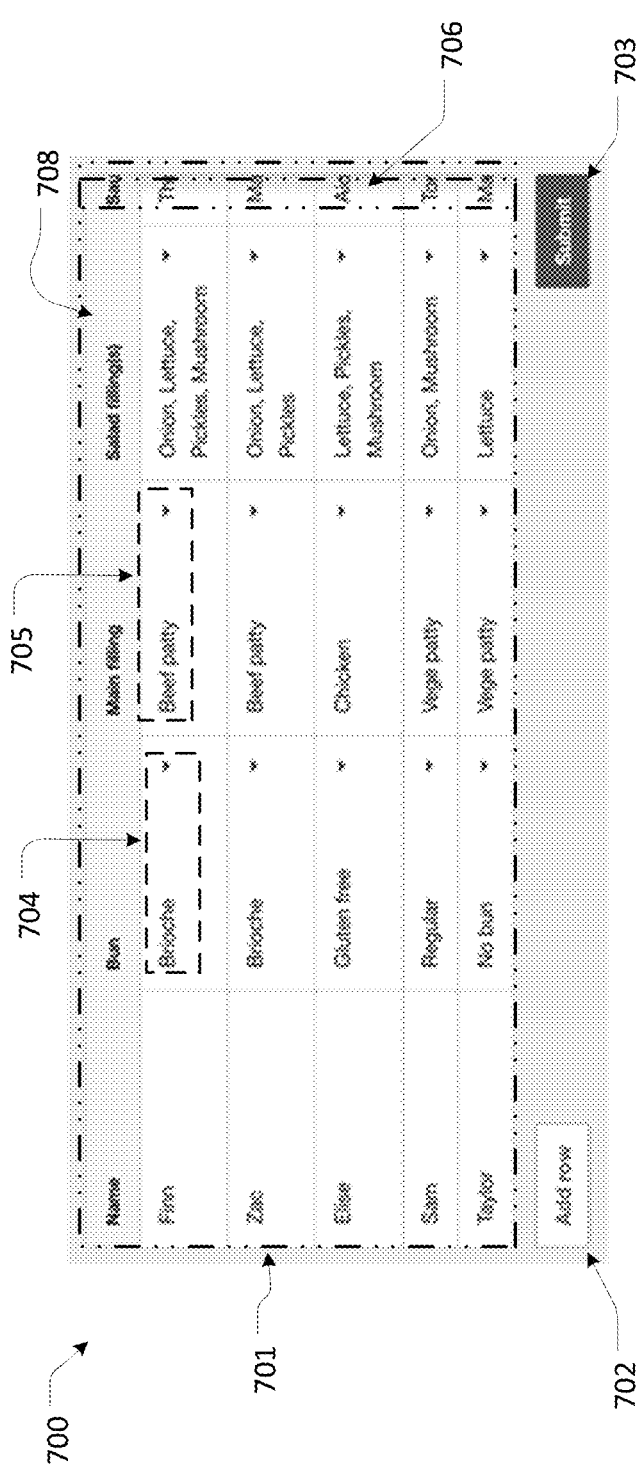
FIG. 7 is a screenshot of a user interface illustrating a rendered data structure comprising tabular data arranged in a dataset presentation structure.
FIG. 9 is a screenshot of a user interface illustrating a rendered display structure comprising tabular data arranged in a dataset presentation structure illustrating a drag and drop operation.

FIG. 7 illustrates a screenshot 700 from display of the user interface 104 of the computing device 102. Illustrated in screenshot 700 is a rendered dataset presentation structure 701 comprising tabular data arranged in a data grid structure. The dataset presentation structure 701 comprises cells or elements, such as elements 704 and 705 that are capable of being edited by selection from a predefined list associated with the element or cell. The dataset presentation structure 701 also comprises an overflow indicator 706 indicating the existence of additional columns to the right of column 708. Screenshot 700 also illustrates an add row button 702 forming part of the rendered display presentation structure. The add row button 702 when clicked allows the creation of a new record or row within the dataset presentation structure 701. The newly created row may be edited through the dataset presentation structure 701. On completion of any changes to the various records of the dataset presentation structure 701, pressing button 703 may submit and save the edited records. In some embodiments, the edited records may be saved in the database 132.

FIG. 8 illustrates a screenshot 800 from display of the user interface 104 of the computing device 102. Illustrated in screenshot 800 is a dataset presentation structure 801 comprising tabular data arranged in a data grid structure. The dataset presentation structure 801 comprises cells or elements, such as element 806 that is capable of being edited by selection from a predefined list associated with the element or cell. Screenshot 800 also illustrates an add row button 804. The add row button 804 when clicked allows the creation of a new record or row within the dataset presentation structure 801. The newly created row may be edited through the dataset presentation structure 801. Region 802 of the screenshot 800 illustrates a predefined list of values. Checkboxes 803 associated with each item in the predefined list allow the reception of user input in relation to each item of the predefined checklist. For example, receiving a checkbox selection against a subset of items in the predefined list of region 802 may allow the designation of values for a particular cell in the dataset presentation structure 801. For example, the selection illustrated in region 802 may designate the value of a cell as 'Lettuce, Mushroom, Pickles'.

FIG. 9 illustrates a screenshot 900 from display of the user interface 104 of the computing device 102. Illustrated in screenshot 900 is a dataset presentation structure 901 comprising tabular data arranged in a dataset presentation structure. Associated with each row in the dataset presentation structure 901 is an anchor region or button 902. The anchor region 902 may be configured to receive a user interaction through a mouse or a touchscreen to move a row by a drag and drop action. The dataset presentation structure 901 may comprise a predefined order of rows and by receiving an input through the anchor region 902, the predefined order of rows may be varied.

In some embodiments, each of the plurality of data row objects of the dataset presentation structure may comprise an editing menu or an overflow menu. The editing menu or overflow menu may comprise specific options accessible to a user to facilitate editing operations with respect to each respective row of the tabular data presented in the dataset presentation structure. The editing operations may include an operation to copy a row, an operation to delete a row or an operation to edit data comprised in the row, for example.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method comprising:
   determining a dataset container for controlling rendering of at least part of a dataset on a display of a computing device, the dataset comprising tabular data including a plurality of columns and a plurality of rows, determining the dataset container comprising:
      determining a data structure comprising a plurality of data column objects, each data column object of the plurality of data column objects configured to represent a respective column of the plurality of columns of the tabular data;
      setting a display status value associated with each data column object; and
      determining a dataset presentation structure encapsulating at least a part of the dataset in accordance with the data structure and the display status values;
   the method further comprising rendering the dataset presentation structure for display on the computing device;
   wherein the dataset container is configured to selectively exclude from the dataset presentation structure a set of data columns objects from among the plurality of data columns objects, the set of data columns objects being determined by the display status values of the respective data columns object.

2. The method of claim 1, wherein the dataset container is configured to selectively exclude the set of columns from the dataset presentation structure by setting a cascading style sheet (CSS) property value of each cell object of the set of columns to a value indicating not to render the respective cell object.

3. The method of claim 2, wherein the setting of the cascading style sheet (CSS) property value is performed by execution of a program code of the dataset container.

4. The method of claim 1, further comprising:
   displaying the rendered dataset presentation structure in a user interface window on the display of the computing device;
   receiving an input indicating one or more of the plurality of columns from the user interface window, the input assigning a display status value to each cell of the indicated one or more columns;
   in response to receiving the input, updating the dataset presentation structure in accordance with the assigned display status values, and re-rendering the dataset presentation structure for display in the user interface window.

5. The method of claim 1, wherein the dataset presentation structure comprises a column selection structure to receive the input indicating the one or more of the plurality of columns.

6. The method of claim 5, wherein the column selection structure comprises a user selectable and deselectable element corresponding to each of the plurality of columns included in the dataset presentation structure; and optionally wherein the user selectable and deselectable element comprises a checkbox or a radio button to receive the column selection input.

7. The method of claim 1, including acquiring the dataset by downloading the dataset from a remote server such as a web server, and wherein the rendering the dataset presentation structure is for display within a user interface window of a web browser application, and optionally wherein the display status values for the plurality of columns are configurable and/or reconfigurable via the user interface window of the web browser application.

8. The method of claim 1, wherein the dataset presentation structure is configured to receive user input for editing the at least part of the dataset.

9. The method of claim 1, wherein each data column object comprises a plurality of cell objects, each cell object of the plurality of cell objects being configured to represent a respective row data of the plurality of rows of the tabular data of the respective column;
   and wherein the display status value is associated with cell object of each respective data column object; and
   wherein the dataset container is configured to selectively exclude from the dataset presentation structure a set of cells from among the plurality of cell objects, the set of cells being determined by the display status values of the respective data cell objects.

10. The method of claim 9, wherein the plurality of cell objects are configured to receive user input for editing data in the plurality of cell objects.

11. A method comprising:
    determining a dataset container for controlling rendering on a display of a computing device of at least part of a dataset comprising tabular data including a plurality of columns, determining the dataset container comprising:
       determining a data structure, the data structure comprising a plurality of data column objects, each data column object of the plurality of data column objects configured to represent a respective column of the plurality of columns of the tabular data;
       calculating at least one dataset dimension attribute value relating to the entire dataset and representing a size of a rendering of the dataset in a first dimension;
       determining a dataset presentation structure encapsulating a part of the dataset in cells in accordance with the data structure, and calculating at least one dataset presentation structure dimension attribute value relating to the part of the dataset and representing a size of a rendering of the dataset presentation structure in the first dimension;

wherein the dataset presentation structure includes adding an overflow indicator to a subset of the cells to define an overflow edge within the part of the dataset based on: the at least one dataset dimension attribute value and the at least one dataset presentation structure dimension attribute value;

the method further comprising:

rendering the dataset presentation structure including the overflow indicator for display on the computing device.

12. A computing device comprising:

one or more processors;

a display, a user input unit; and memory comprising computer executable instructions, which when executed by the one or more processors, cause the system to:

determine a dataset container for controlling rendering of at least part of a dataset on a display of a computing device, the dataset comprising tabular data including a plurality of columns and a plurality of rows, wherein determining the dataset container comprising:

determining a data structure comprising a plurality of data column objects, each data column object of the plurality of data column objects configured to represent a respective column of the plurality of columns of the tabular data;

setting a display status value associated with each data column object; and determining a dataset presentation structure encapsulating at least a part of the dataset in accordance with the data structure and the display status values; and render the dataset presentation structure for display on the computing device;

wherein the dataset container is configured to selectively exclude from the dataset presentation structure a set of data columns objects from among the plurality of data columns objects, the set of data columns objects being determined by the display status values of the respective data columns object.

13. The computing device of claim 12, wherein the dataset container is configured to selectively exclude the set of columns from the dataset presentation structure by setting a cascading style sheet (CSS) property value of each cell object of the set of columns to a value indicating not to render the respective cell object.

14. The computing device of claim 13, wherein the computer executable instructions, when executed by the one or more processors, cause the system to execute program code of the dataset container to set the cascading style sheet (CSS) property value.

15. The computing device of claim 14, wherein the computer executable instructions, when executed by the one or more processors, cause the system to:

display the rendered dataset presentation structure in a user interface window on the display of the computing device;

receive an input indicating one or more of the plurality of columns from the user interface window, the input assigning a display status value to each cell of the indicated one or more columns;

in response to receiving the input, update the dataset presentation structure in accordance with the assigned display status values, and re-render the dataset presentation structure for display in the user interface window.

16. The computing device of claim of claim 12, wherein the dataset presentation structure comprises a column selection structure to receive the input indicating the one or more of the plurality of columns.

17. The computing device of claim 16, wherein the column selection structure comprises a user selectable and deselectable element corresponding to each of the plurality of columns included in the dataset presentation structure; and optionally wherein the user selectable and deselectable element comprises a checkbox or a radio button to receive the column selection input.

18. A non-transitory computer-readable storage medium storing instructions that, when executed by a computer, cause the computer to perform operations including:

determining a dataset container for controlling rendering of at least part of a dataset on a display of a computing device, the dataset comprising tabular data including a plurality of columns and a plurality of rows, determining the dataset container comprising:

determining a data structure comprising a plurality of data column objects, each data column object of the plurality of data column objects configured to represent a respective column of the plurality of columns of the tabular data;

setting a display status value associated with each data column object; and determining a dataset presentation structure encapsulating at least a part of the dataset in accordance with the data structure and the display status values;

the operations further comprising rendering the dataset presentation structure for display on the computing device;

wherein the dataset container is configured to selectively exclude from the dataset presentation structure a set of data columns objects from among the plurality of data columns objects, the set of data columns objects being determined by the display status values of the respective data columns object.

19. A non-transitory computer-readable storage medium of claim 18, wherein the dataset container is configured to selectively exclude the set of columns from the dataset presentation structure by setting a cascading style sheet (CSS) property value of each cell object of the set of columns to a value indicating not to render the respective cell object.

20. A non-transitory computer-readable storage medium of claim 19, wherein the operations further include executing program code of the dataset container to set the cascading style sheet (CSS) property value.

* * * * *